UNITED STATES PATENT OFFICE.

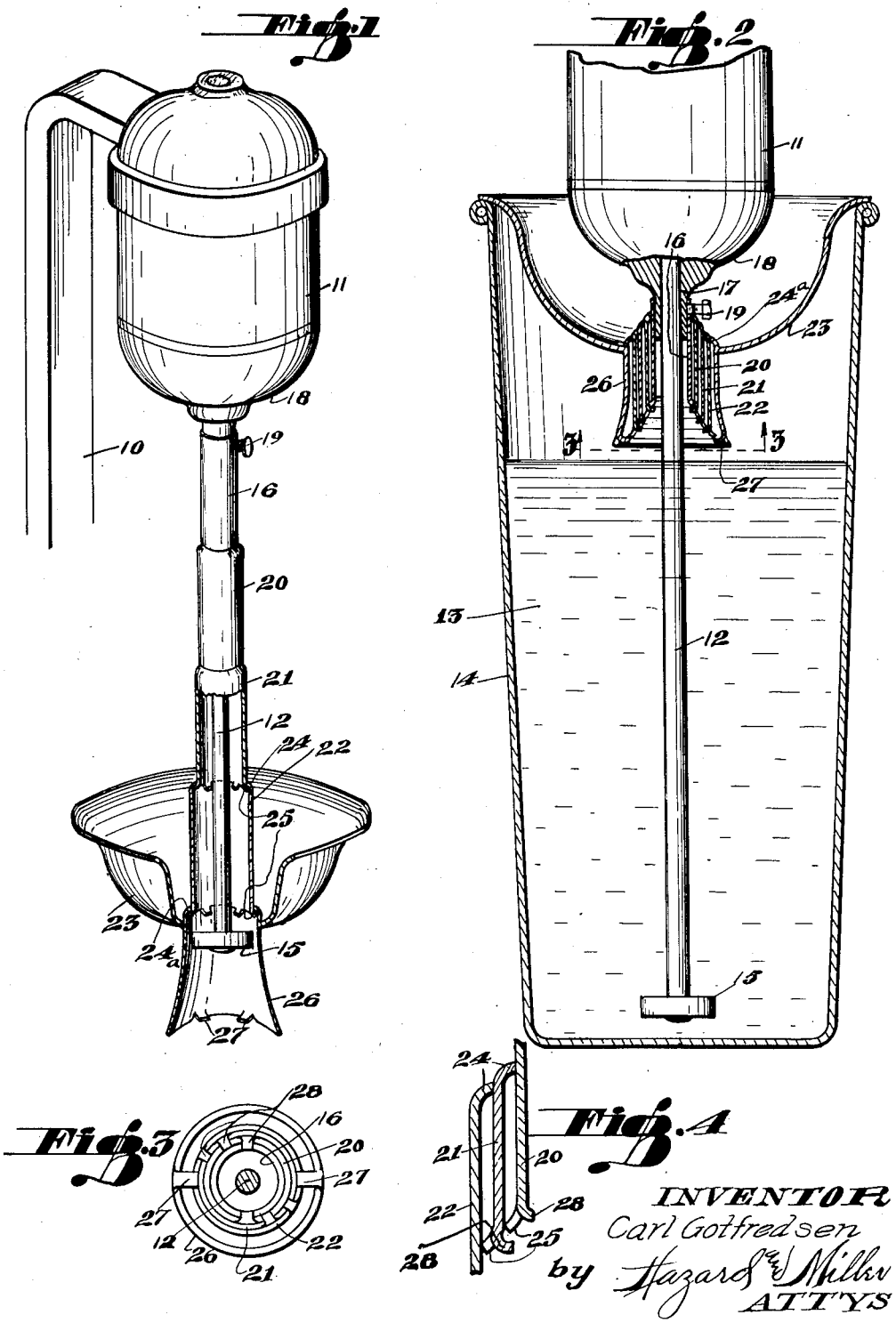

CARL GOTFREDSEN, OF LOS ANGELES, CALIFORNIA.

PROTECTIVE SHIELD FOR MIXERS AND THE LIKE.

1,412,401. Specification of Letters Patent. Patented Apr. 11, 1922.

Application filed October 14, 1920. Serial No. 416,851.

*To all whom it may concern:*

Be it known that I, CARL GOTFREDSEN, a subject of the King of Denmark, residing at Los Angeles, in the county of Los Angeles and State of California, have invented new and useful Improvements in Protective Shields for Mixers and the like, of which the following is a specification.

This invention relates to soft drink mixers, and particularly to a class of mechanical mixers having a revolving beater adapted to be inserted in the receptacle in which the drink is being mixed, for the purpose of mixing the contents therein.

The type of mixer now most commonly used, and the type to which my invention is applicable, consists generally of a standard upon which is mounted a small electric motor, the shaft of the motor being extended, and having a beater on its extremity, to extend into the receptacle in which the drink is being mixed. One type of machine is constructed with a telescoping standard, by which the motor and beater are vertically adjustable, and the receptacle is placed in position in vertical alinement with the beater shaft, and the standard then telescoped to the desired position with the beater extending down into the contents of the receptacle. In another type of machine the standard and motor, together with its beater shaft, are fixed and a movable support is arranged below the beater shaft, for removably supporting the mixing receptacle. My invention is applicable to either of these types of machine.

In the construction of these machines the motor is supported upon the standard with its axis vertically disposed, and the beater shaft made long enough to extend down into the mixing receptacle. With this type of device considerable difficulty is experienced by reason of the fact that oil from the motor drips down into the contents of the receptacle; and also the contents of the receptacle splash upwardly and short-circuit the motor during mixing. For the latter reason the receptacle generally cannot be filled to the top. Therefore, it is the principal object of my invention to provide an attachment for a device of this character, whereby the top of the mixing receptacle is covered, the oil being prevented from dripping down into the contents of the receptacle, and the contents prevented from splashing upwardly on the motor.

A further object is the provision, in a device of this character, of a cover which is adjustable to mixing receptacles of different heights.

As it is not practicable to wash these devices each time they are used, and as some of the materials they have been mixing generally adhere to them, attracting dirt and insects, it is another object of my invention to provide a construction whereby the beater is covered during periods of non-use, thereby making it more sanitary.

The merits of my invention will be more fully set forth in the following specification taken in connection with the accompanying drawings, in which:

Figure 1 is a perspective view of my invention, parts being shown in section, and showing the beater covered when not in use.

Fig. 2 is a transverse vertical section taken through the center of a mixing receptacle, and showing my device in use.

Fig. 3 is a detail section taken as indicated by the line 3—3 of Fig. 2.

Fig. 4 is an enlarged fragmentary section showing the construction of the telescoping sleeves.

Referring now to the drawings, the numeral 10 indicates a portion of a typical supporting standard on which is supported the electric motor 11. The armature shaft 12 of the motor 11 is shown to be extended, to permit its extension down into the contents 13 of the mixing receptacle 14. The shaft 12 has a beater 15, of any suitable type, mounted on its lower end. The mechanism so far described, together with its electrical connections, is well known; and as it forms no part of my invention, further detailed description of the same will not be made.

My invention comprises essentially a plurality of telescoping sleeves mounted upon the shaft 12, the inner sleeve 16 being mounted on the lower end 17 of the motor casing 18. The sleeve 16 is rigidly secured in place by means of a set screw 19. A plurality of concentric sleeves 20, 21 and 22 are arranged around the sleeve 16 and adapted to telescope for the purpose of making the cover 23, adjustable to fit receptacles of different heights, and to make an extensible covering for the beater when not in use. The sleeves 20, 21 and 22 are each turned inwardly at their tops, as indicated at 24, in Fig. 4, for the purpose of making a reasonably tight joint. The bottom edges of the sleeves 16, 20, 21 and 22 each are out-turned, as at 25, for the purpose of engaging the in-turned tops 24 of the surrounding sleeves, to prevent them from becoming separated when extended.

The cover 23 is concave as shown in Fig. 2 and has its upper edge out-turned to engage the top of the mixing receptacle 14, however, any suitable construction may be used. A central sleeve 26 is formed integral with the cover 23, extending downwardly from the bottom, and being formed with an in-turned top 24ª, to engage the concentric sleeve 22, and to be engaged by the out-turned edge 25 on the bottom of said sleeve, when the sleeves are in extended position, as shown in Fig. 1. The bottom edge of the sleeve portion 26, of the cover, has in-turned lugs 27 for engaging the bottom of the sleeve 22, and supporting it when in collapsed position, as shown in Fig. 2. The sleeves 16, 20, 21 and 22 likewise have in-turned lugs 28 struck from the out-turned edges 25, as clearly shown in Fig. 4, for the purpose of engaging the out-turned edges 25, of the inner adjacent concentric sleeves and supporting the shield in collapsed position.

The lugs 28 may be struck from the edge of the concentric sleeve and bent inwardly, while the edges 25 may be formed by bending the edge of each sleeve outwardly, as shown in Fig. 3; the principal object being to form an out-turned lower edge for engaging the in-turned upper edge of the outer adjacent concentric sleeve when in extended position, and an in-turned lower edge adapted to engage the lower out-turned edge, of the next inner sleeve, for supporting the sleeves in telescoped position.

It may be here stated that any number of concentric sleeves, such as 16, 20, 21 and 22, may be provided, depending on the extent of adjustment it is desired to have between the top 23 and the receptacle 14, and the length of the beater shaft.

While I have here shown and described the preferred form of my device it is understood that I have reserved the right to make any changes or modifications in structure which properly come within the scope of the appended claims.

Having described my invention I claim:

1. The combination with a mixer having a longitudinally movable rotating shaft, of a receptacle cover received around said shaft, and a protector for said shaft including telescoping sleeves mounted thereon, with the inner sleeve secured to one end of said shaft, and the outer sleeve secured to and extending beyond said receptacle cover, so that when said sleeves are in extended relation the outer sleeve will project downwardly beyond said cover so as to form an individual cover for the end of said shaft.

2. The combination with a mixer having a longitudinally movable rotating shaft, of a protective shield for said shaft, which protective shield comprises a plurality of telescoping sleeves, the upper end of the inner one of which is fixed to the shaft, the other sleeves having in-turned upper edges and outwardly turned lower edges and portions of said inwardly turned lower edges being bent outwardly so as to engage the inwardly turned upper edges of the sleeves to retain the same in assembled relation when in extended position, which outwardly turned lower edges are adapted to engage the inwardly turned lower edges of the sleeves to retain the latter in assembled relation when in telescoped position, and a cover member secured to the upper portion of the outer one of said sleeves.

In testimony whereof I have signed my name to this specification.

CARL GOTFREDSEN.